Feb. 23, 1943.    N. TITLESTAD ET AL    2,312,223
HEAT RECOVERY SYSTEM
Filed Oct. 14, 1940
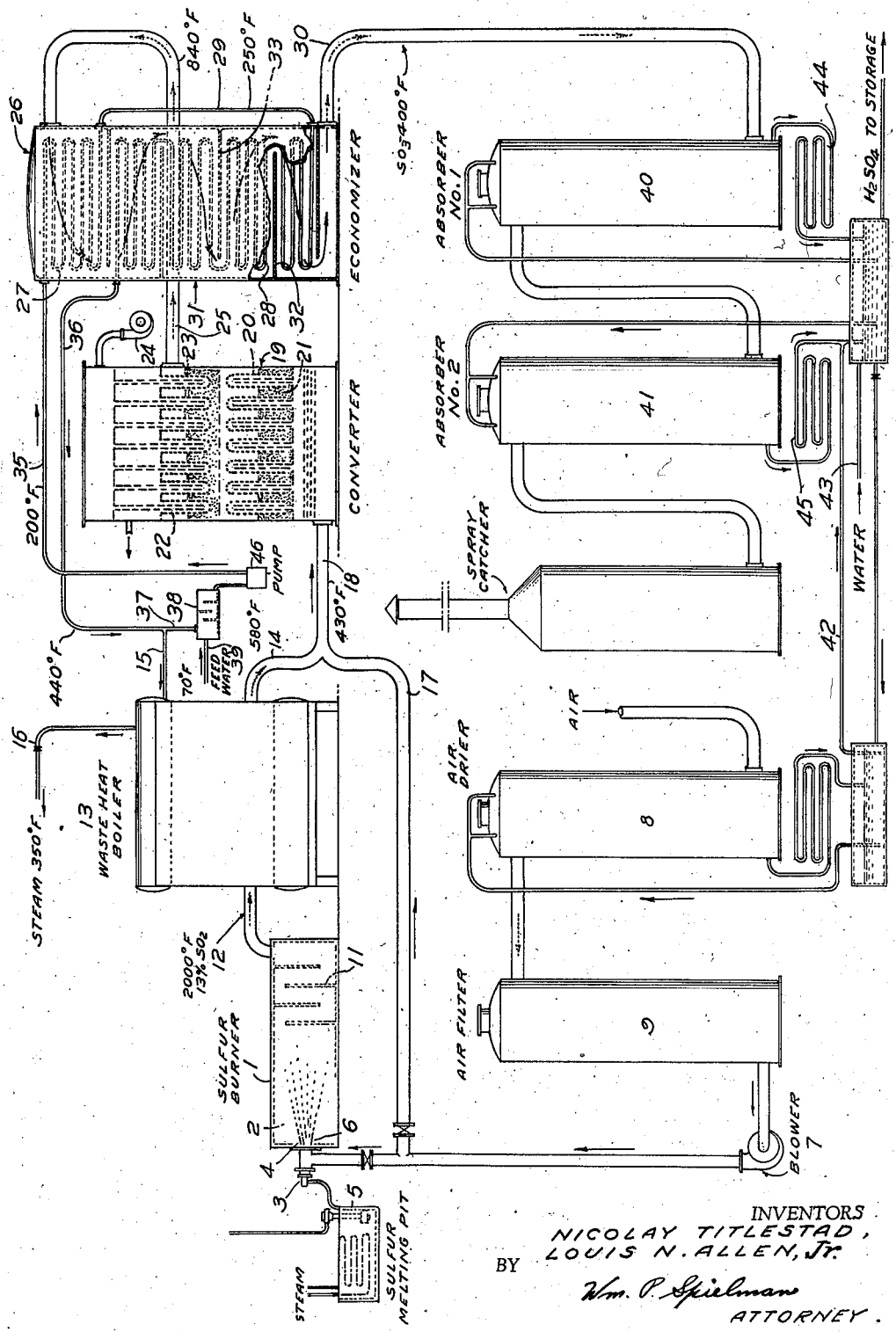
INVENTORS
NICOLAY TITLESTAD,
LOUIS N. ALLEN, Jr.
BY
Wm. P. Spielman
ATTORNEY.

Patented Feb. 23, 1943

2,312,223

UNITED STATES PATENT OFFICE 2,312,223

HEAT RECOVERY SYSTEM

Nicolay Titlestad, White Plains, N. Y., and Louis N. Allen, Jr., Nutley, N. J., assignors to Chemical Construction Corporation, New York, N. Y., a corporation of Delaware Application October 14, 1940, Serial No. 361,114

4 Claims. (Cl. 23—176)

This invention relates to an improved process and apparatus for the manufacture of sulfuric acid by the contact process, and particularly to a method and apparatus for recovering waste heat generated in such a process. A principal object of the invention resides in the recovery of the sensible heat contained in the sulfur trioxide gases leaving the catalytic converter in such a form that it may be usefully applied in the generation of high pressure steam in a waste heat boiler.

In many contact sulfuric acid plants, particularly in those which operate with sulfur as raw material, it is now standard practice to pass the gases from the sulfur burner through a waste heat boiler in order to generate steam from the excess heat contained in these gases. When a boiler is used such as that described in U. S. Patent No. 2,122,390, stack temperatures as low as 550–600° F. can be obtained with correspondingly high efficiency. Upon passage of the resulting gases through a catalytic converter after admixture with additional air if necessary, the resulting sulfur trioxide gases have a temperature of about 850° F. or higher, depending on the type of converter employed. It is necessary to cool these gases to much lower temperatures before efficient absorption can be obtained, and heretofore this cooling has been carried out in air coolers with no provision for recovering the heat.

The problem of cooling sulfur trioxide gases is much more difficult than that of cooling the corresponding sulfur dioxide gases of similar moisture content. Any cooling surface in contact with such gases will be covered with a film of sulfuric acid whenever it has a temperature below the dew point of the gases, and corrosion is therefore a serious factor. When it is considered that an effective sulfur trioxide cooler should cool the gases for absorption to temperatures of about 400° F., or less, it will be seen that the problem of recovering useful heat from this source without excessive corrosion of the equipment is not an easy one.

We have now devised a method and apparatus whereby the excess heat generated in the catalytic converter of a contact sulfuric acid plant can be recovered as steam while cooling the sulfur trioxide gases to temperatures suitable for absorption. In its broadest aspects our invention is based on the steps of passing the hot sulfur trioxide gases through a gas cooler or economizer in heat exchange relation with a confined body of water maintained under a relatively high hydrostatic pressure, whereby the gases are cooled and the water is heated, and then passing all or a portion of the resulting superheated water into an ordinary waste heat boiler of the type referred to above where its sensible heat is usefully employed in the manufacture of high pressure steam. By this means we not only recover the excess sensible heat of the sulfur trioxide gases, but we ultimately employ this heat energy in the generation of high pressure steam.

The principles of our invention will be described in greater detail with reference to the accompanying drawing, which is a flow sheet illustrating a preferred modification thereof. It should be understood, however, that in many respects this drawing is diagrammatic in character; thus, for example, the relative size of the economizer or sulfur trioxide gas cooler has been greatly exaggerated in order that its details may be shown. It should also be understood that the invention in its broader aspects is not limited to the type of plant shown, and that other types of sulfur burners, converters, and absorbing systems may be employed within the scope of the invention.

On the drawing the reference numeral 1 represents a sulfur burner of a standard type, consisting of an elongated chamber 2 provided at one end with an injector type burner 3 having a central spray nozzle 4 for injecting molten sulfur from a sulfur melting pit 5 and an outer air injecting nozzle 6 for surrounding the stream of sulfur droplets with an envelope of air from the blower 7. This air is preferably dried to a moisture content of about 0.001–0.003 g. per cubic foot by scrubbing with strong sulfuric acid in the air drier 8 after which it is filtered through sand, coke, glass wool or other suitable filtering media in the air filter 9.

The end of the sulfur burner 1 opposite the sulfur injector 3 is provided with a series of staggered baffles 11 forming therewith a combustion chamber to insure complete combustion of the sulfur. In normal operation the gases leaving this chamber have a sulfur dioxide content of about 13% and a temperature of 2000° F., and these gases are passed through the pipe 12 into the gas inlet of a waste heat boiler 13. This boiler is described in detail in the patent of J. Eklund, No. 2,122,390, dated January 28, 1938, and the description need not be repeated here. For present purposes it is sufficient to state that the boiler is a water tube boiler designed especially for recovering the waste heat present in gases, that it has a gas inlet 12, a stack gas outlet 14, a feed water inlet 15 and a valved steam outlet 16 and that in normal operation it will generate saturated steam at 200 to 400 pounds gage pressure with stack gas temperatures of about 580°-650° F. when operated in accordance with the principles of the present invention. Obviously, any other suitable type of boiler could be used if desired.

In ordinary waste heat boiler practice it is desirable to maintain a high temperature in the inlet gases and therefore it is customary to use only sufficient air in the sulfur burner to insure complete combustion of all the sulfur. Air is usually mixed with the stack gases leaving the boiler to reduce the sulfur dioxide content to about 7-8%, and this practice is illustrated on the drawing wherein additional air from the blower 7 is introduced through the pipe 17 and mixed with the sulfur dioxide gases from the boiler in the pipe 18. The gas mixture, which then has a temperature of about 430-450° F., is thereupon introduced into a catalytic converter 19 of the heat exchange type where its sulfur dioxide content is oxidized to sulfur trioxide in the presence of a contact mass containing a catalyst which is preferably an oxide of vanadium.

The converter 19 is illustrated as an internally cooled converter, although it is evident that converters of other types may be used if desired. This converter, which is now in wide commercial use, contains a lower set of double countercurrent heat exchangers 20 which operate to cool the lower layer of contact mass 21 by transferring excess heat of conversion to the incoming reaction gas mixture and an upper set of heat exchange tubes 22 which cool the upper catalyst layer 23 by means of air injected through the blower 24. The course of the catalytic reaction is thereby closely controlled, and a 96-98% conversion of sulfur dioxide to sulfur trioxide is obtained when a highly active vanadium catalyst mass is used. The resulting sulfur trioxide gases then leave the converter through the exit pipe 25 at a temperature of about 840° F. and are ready for introduction into the economizer or sulfur trioxide cooler which constitutes one of the principal features of the present invention.

As has been explained, it is necessary to cool the sulfur trioxide gases from their conversion temperature to about 400° F. in order to obtain an efficient absorption and conversion of their sulfur trioxide content into strong sulfuric acid. For this purpose we provide a gas cooler or economizer 26 in the form of a heat exchanger which is preferably provided with an upper water tube bank 27 for passing a stream of water in indirect heat exchange relation with the gases near its gas entrance and a lower tube bank 28 for passing water in indirect heat exchanging relation with the gases nearer its gas exit. These two banks of tubes are connected by a pipe 29 so that in operation there is a continuous passage of water through the cooler in indirect heat exchanging relation with a continuous stream of the hot sulfur dioxide gases entering through the pipe 25 and leaving through the gas exit pipe 30.

The economizer 26 illustrated in the drawing is simple in construction and can readily be made at relatively low cost from acid-proof materials if desired. However, as will be explained, the preferred modifications of the invention operate in such a manner that in ordinary operation the cooler is not subject to sulfuric acid condensation, and in actual practice acid-proof material is not usually necessary. The economizer consists essentially of an outer shell 31 provided with staggered baffles 32 and 33 to extend the length of travel of the gases and the upper and lower tube banks 27 and 28 referred to above. These banks of tubes are preferably constructed in the form of pipe coils, if a cylindrical economizer is used, or in the form of straight lengths connected by joints if the apparatus is rectangular. In either case, however, it is an advantage of the invention that ordinary piping may be used so that repairs and replacements are greatly simplified.

As is apparent from the drawing the lower tube bank 28 constitutes the main heat exchanging surface of the economizer and the water therein passes in a direction countercurrent to that of the gases entering through the pipe 25. The upper tube bank 27 is relatively small in size, and the water therein passes in a direction cocurrent with that of the gases. This arrangement is best suited to avoid condensation of sulfuric acid mist and subsequent corrosion problems for the following reasons:

Condensation of sulfuric acid from a gas of any given sulfur trioxide and moisture content is a direct function of the temperature of a condensing surface. In the upper tube bank 27 the outer surfaces of the tubes will have a temperature between the water temperature and the gas temperature. With water temperatures of 200-250° F. and a gas temperature of about 840° F., as shown on the drawing, the calculated surface temperature is about 300° F., which is sufficiently high to offset corrosion difficulties. In the lower tube bank 28 the water temperature is higher (250-440° F.) but the gas temperatures are considerably lower and the surface temperature of the tube remains approximately the same. It will thus be seen that by first passing the cooler water in heat exchanging relation with the hot sulfur trioxide gases entering the cooler and then passing the resulting preheated water in countercurrent heat exchange with the same gases nearer the gas exit of the cooler a relatively constant temperature is maintained on the outer surfaces of the cooling coils.

It is an important feature of the invention that the tube banks 27 and 28 of the economizer are directly connected with the feed water inlet pipe 15 of the boiler by means of a pipe 36 and that the water inlet pipe 35 connects these coils with the boiler feed pump 46. The result of this arrangement is that the water in the tube banks 27 and 28 is always under the same hydrostatic pressure as the water in the boiler so that the steam generated throughout the entire system is always under the same pressure. With this arrangement the economizer can be either of the steaming or non-steaming type, depending upon the amount of heat to be extracted from the sulfur trioxide gases, but in either case the resulting steam or superheated water or mixture thereof is introduced directly into the boiler. This results in the addition of all the heat recovered from the sulfur trioxide gases to the heat taken up in the waste heat boiler 13 and greatly simplifies and cheapens the construction of the equipment and its ease of operation.

In addition to supplying important amounts of heat to the boiler the superheated water in the pipe 36 can also be used to preheat the feed water entering through the pipe 35, thereby overcoming the corrosion problem in the economizer 26 as has been described. Thus, for example, a part of the water from the pipe 36 may be introduced through the pipe 37 into a baffled mixing chamber 38 where it is mixed with feed water entering through the pipe 39. In ordinary operation sufficient hot water from the pipe 36 is preferably used in this manner to raise the temperature of the feed water to about 200° F. or higher, and the mixing chamber 38 is connected with the water inlet pipe 35 through the pump 46 so that the feed water enters the economizer at this temperature. Of course, it is equally feasible to employ indirect heat exchange instead of direct heat exchange in the feed water heater 38 in which case all the water in pipe 36 would simply pass through a coil in the feed water heater 38 before being admitted to the boiler 13.

The sulfur trioxide gases leaving the economizer through the pipe 30 are admitted to absorbers 40 and 41 which operate in the usual manner to extract their sulfur dioxide content by contact with recirculating streams of 98% sulfuric acid. Diluted acid from the drying tower 8 is preferably added to the absorbing system through the pipe 42 and additional water may be introduced through the pipe 43 if necessary. Inasmuch as the greater part of the heat has been removed from the entering sulfur trioxide gases by the operation of the economizer 26, no excess burden is placed on the acid cooling coils 44 and 45, and a thorough and efficient heat recovery is obtained in the entire plant.

What we claim is:

1. Apparatus for recovering waste heat generated in a contact sulfuric acid process comprising in combination a waste heat boiler and means for passing hot sulfur dioxide gases therethrough, means including a catalytic converter for oxidizing to sulfur trioxide the sulfur dioxide content of the gases leaving said boiler and thereby generating additional heat, a gas cooler having a water inlet and a water outlet, means for passing hot sulfur trioxide gases from the converter through said gas cooler, means for passing water through said cooler in indirect heat exchanging relation with said gases to extract heat therefrom, means for conducting the resulting heated water from the water outlet of said cooler to the feed water inlet of the waste heat boiler, and means for preheating feed water for said cooler by heat exchange with water leaving said cooler whereby excessive chilling of the sulfur trioxide gases is avoided.

2. Apparatus for recovering waste heat generated in a contact sulfuric acid process comprising in combination a waste heat boiler and means for passing hot sulfur dioxide gases therethrough, means including a catalytic converter for oxidizing to sulfur trioxide the sulfur dioxide content of the gases leaving said boiler and thereby generating additional heat, a gas cooler having means for passing the hot sulfur trioxide gases therethrough, means in said cooler for passing a stream of water first in concurrent heat exchanging relation with the gases near its gas entrance and then in countercurrent heat exchange relation with the gases nearer its gas exit, and means for conducting the resulting heated water from the water outlet of said cooler to the feed water inlet of the waste heat boiler.

3. Apparatus for recovering waste heat generated in a contact sulfuric acid process comprising in combination a waste heat boiler and means for passing hot sulfur dioxide gases therethrough, means including a catalytic converter for oxidizing to sulfur trioxide the sulfur dioxide content of the gases leaving said boiler and thereby generating additional heat, a gas cooler having means for passing the hot sulfur trioxide gases therethrough, means in said cooler for passing a stream of water first in indirect heat exchanging relation with the gases near its gas entrance and then with the gases nearer its gas exit, means for conducting the resulting heated water from the water outlet of said cooler to the feed water inlet of the waste heat boiler, and means for preheating feed water for said cooler by heat exchange with the hot water leaving said cooler, whereby excessive chilling of the sulfur trioxide gases is avoided.

4. A method of recovering waste heat generated in a contact sulfuric acid process which comprises the steps of first passing hot sulfur dioxide gases in heat exchanging relation with a confined body of water to remove excess heat therefrom and generate steam under pressure, then oxidizing to sulfur trioxide the sulfur dioxide content of the gases and thereby generating additional heat, then passing the resulting hot sulfur trioxide gases in heat exchanging relation with a second confined body of water preheated in the manner hereinafter described and maintained under a pressure substantially equal to that of said first confined body of water to further heat said water and aid in the generation of steam, and then transferring heat from the resulting heated water to cold feed water for the system in order to preheat said cold feed water.

NICOLAY TITLESTAD.
LOUIS N. ALLEN, Jr.